United States Patent Office 3,407,127
Patented Oct. 22, 1968

3,407,127
METHOD OF RECOVERING RHENIUM VALUES FROM RHENIUM-CONTAINING SCRAP MATERIAL
William H. Davenport, Woodbury, Conn., assignor to Chase Brass & Copper Co. Incorporated, Waterbury, Conn., a corporation of Connecticut
No Drawing. Filed July 6, 1965, Ser. No. 469,904
7 Claims. (Cl. 204—82)

This invention is directed to a process for the recovery of rhenium metal values from rhenium-containing scrap material, and more particularly to the recovery of these values as salts of perrhenic acid commercially usable as such or readily convertible to pure metal.

Rhenium metal is still a relatively expensive metal, although commercial use of it, particularly in the form of alloys with tungsten and molybdenum, has increased rapidly in recent years because of a number of substantial advantages which such alloys provide over the best previously available materials. Such increase in commercial use has led in turn to greater need for refinements and improvements in methods of extracting rhenium from its ores initially, and has also placed greater emphasis on the economical recovery of rhenium values from scrap material. This scrap may contain varying amounts of rhenium, ranging in the case of dilute rhenium-tungsten alloys from a fraction of one percent to scrap of virtually pure rhenium.

Perhaps the chief problem in rhenium metallurgy is the necessity for extremely high purity of the metal, since even minute traces of extraneous metal or other components have a profound and generally undesirable effect on the properties of the metal which make it attractive for many industrial applications.

There are several alternative procedures for the recovery or separation of the rhenium from other metalliferous cocponents in scrap, and attempts have been made to adopt these procedures to provide a recovery process that is commercially attractive. While these techniques for recovery are generally well known, they have their problems, particularly when not conducted on a laboratory or experimental level, so that there has existed a real need for a process or system that can be used satisfactorily under the far less disciplined conditions obtaining in commercial operation. A recovery process has now been discovered, as disclosed herein, which represents a substantial practical step forward in solving this problem.

Of the several lines of approach that present themselves in the development of a suitable recovery process, probably one of the first to come to mind is the fusion of rhenium scrap with a salt such as sodium nitrate. Since however most rhenium scrap contains substantial if not predominating amounts of tungsten, the relative high solubility of both sodium tungstate and sodium perrhenate introduces problems of separation, with the result so far that this approach has led to excessive loss of the rhenium values. It is further complicated by the necessity to add the metal scrap during the fusion in a particular manner, that is by blending wire, rod, strip and powder forms of scrap under carefully controlled conditions which do not lend themselves to commercial operations.

A second approach is by way of acid dissolution of the metal scrap. Here it is found that hydrochloric and sulfuric acid are not effective in dissolving the rhenium values, and while nitric acid will dissolve them, a protective oxide develops on the tungsten usually present in the alloy scrap, leading to a passive condition. In order to counteract this and to maintain continued reaction, it is necessary to add hydrofluoric acid. The handling and control of the latter is notoriously troublesome.

Direct oxidation of the rhenium-containing scrap material to one or more of the oxides of rhenium, followed by solvent extraction, is another approach which comes to mind. Attempts made in this direction have presented difficulties. A method has recently been discovered, as disclosed in copending application Ser. No. 437,774 filed Mar. 8, 1965, and now Patent No. 3,348,942 which provides a much improved recovery procedure. Still the high temperature required for complete oxidation of the scrap, and the reaction with the vessels or containers in which the scrap is oxidized, both are disadvantages. This direct oxidation method becomes less attractive furthermore when the scrap is relatively dilute in respect to rhenium, or when it contains significant amounts of other metals such as copper or iron, all of which tend to tie up the oxidation process.

Still another approach to the problem is that of electrolytic dissolution of the scrap. While this may at first seem like a simple and straightforward approach, there are in fact a great many practical difficulties. First of all, the deposit of an integral plate of rhenium on a cathode is undesirable. The high refractory nature of rhenium makes fabrication of the metal virtually impractical except by powder metallurgic techniques, therefore production of the metal in granular or powder form is much desired. As already mentioned, even infinitely small traces of other elements in rhenium, and particularly those more volatile than rhenium such as the alkali metals, have a vast effect upon the density of the sintered powder compact. One of the more effective ways of eliminating such trace metals is by treatment of rhenium in solution, in the form of one of its soluble salts, by ion exchange processes. Therefore until thus purified, it is many times desirable to keep the rhenium values in solution or in a form readily put into solution. Thus, if an electrolytic process is to be employed, plating out of the metal values on a cathode must be avoided. The objective accordingly is to so dissolve the values that they go into a solution which can then be readily treated to remove extraneous metals and other contaminants by customary procedures, including the ion exchange step alluded to above. Even then, the selection of a satisfactory electrolyte still involves many conflicting considerations, more especially ease of separation and recovery of rhenium values from extraneous contaminants originally present or introduced during the process.

Various electrolytes have been investigated in the development of this invention in an attempt to get effective electrolytic dissolution without encountering these difficulties. Dissolution will occur initially in acid solution using sulfuric, hydrochloric or nitric acid, but it cannot proceed because the tungstic acid formed is insoluble in acid media. There also remains the problem of separation of the rhenium from the resulting solutions, since the sulfate, chloride and nitrate anions introduce added contaminants which must finally be eliminated.

Hydrogen peroxide would appear from a theoretical standpoint to be very desirable for this reason, but in practice it is an inefficient and quite ineffective electrolyte, as well as being too expensive. Hydrogen peroxide will dissolve rhenium and rhenium alloy scrap, however reasonably fast rates can only be obtained by continuous replacement of the partially depleted reagent with fresh, full strength hydrogen peroxide. When electrolytic action is involved, decomposition of the peroxide can also occur. In both cases poor efficiency results in an increase in cost which initially is undesirably high.

Neutral solutions of electrolyte such as ammonium nitrate or ammonium sulfate show extremely low and quite impractical dissolution rates, and again introduce the problem of separation of the rhenium values from the resulting products in solution.

Better dissolution rates are obtained with most alkaline electrolytes, as for example an ammoniacal solution of ammonium sulfate. Here, however, the resulting product contains a mixture of ammonium salts of rhenium, and any other alloy metal such as tungsten which is usually present, along with the sulfate. So that again there is a difficult separation problem presented.

Solutions of bases such as sodium hydroxide show better dissolution rate but in the case of sodium hydroxide the solubility of sodium perrhenate and sodium tungstate are both so high as to make the separation of these a considerable problem. Calcium hydroxide also is effective as an electrolyte. Although calcium perrhenate is quite soluble and calcium tungstate is relatively insoluble, since this latter component is predominant in the system, the mass action effect of the precipitation of this component causes unavoidably high losses of the calcium perrhenate.

Other alkali or alkaline earth metals such as lithium, strontium and magnesium produce perrhenate salts which are very soluble, even more so than sodium perrhenate, but the tungstate salts of these compounds are also sufficiently soluble so as again to be of no help. Barium hydroxide produces an insoluble perrhenate salt, but barium tungstate is only slightly soluble so that the separation problem still remains.

Ammonium hydroxide appears desirable as an electrolyte, especially since rhenium purification processes conventionally treat rhenium in the form of its ammonium perrhenate salt. Dissolution of rhenium-containing scrap can be effected in ammonium hydroxide, although the efficiency of this electrolyte is poor. Best results are obtained by continuously bubbling ammonia through the solution which not only maintains the alkalinity of the solution but also saturates it, precipitating ammonium perrhenate and allowing it to be separated continuously. The bubbling of ammonia through the solution also produces agitation which is desirable. The following example is given as an illustration of typical results obtained using this electrolyte.

Example I

Scrap tungsten-rhenium alloy (75%–25%) was suitably suspended in a stainless steel container which latter served as the cathode of an electrolytic cell through connection to the negative side of a source of direct current. The scrap in turn was connected to the positive side of the current source. The container was partially filled with an electrolyte which consisted of concentrated ammonium hydroxide, approximately 14.8 molar. A small addition of ammonium perrhenate, approximately 0.375 molar, was made to act as a prime to get the dissolution started more quickly, as the resistance of pure ammonium hydroxide solution is quite high. An initial potential of 3 volts was applied across the electrodes and the electrolysis proceeded with vigorous gas evolution which served to keep the electrolyte agitated. The current and dissolution rate varies with electrolyte temperature as well as concentration, increasing as the temperature increases which occurs because of resistance heating effect in the cell. While the current at the start of the process was only about 5 amps., the rate was allowed to rise to around 50 amps. and the electrolyte temperature to around 80° C. as the process continued. Under these conditions, which were about optimum, the current density at the cathode was 3.8 amps. per square decimeter. In order to maintain this rate it was necessary to bubble ammonia through the solution or to add additional ammonium hydroxide to make up for consumption of the electrolyte in the electrolysis process. The average rate of dissolution of scrap in this process was approximately 100 grams per hour. No adherent deposit of metal appeared on the stainless steel container.

The product of the process was a solution of ammonium salts of rhenium and tungsten. Separation of these was effected by adding hydrogen peroxide to the solution, heating to just below boiling and vacuum filtering. This produced a first gray insoluble, and the filtrate was further evaporated and allowed to cool repeatedly with filtration at each cycle. In this manner, recovery of better than 93% of the total starting metal was recovered in the form of ammonium salts which could then be further separated by oxidation in conventional manner.

While the foregoing process is operative, it has been found that potassium hydroxide as an electrolyte is uniquely effective in terms of a commercially practical process. Potassium hydroxide is not only a good electrolyte permitting the passage of reasonable amounts of current through solution and consequently higher dissolution rates to be obtained, but it has the advantage that the potassium perrhenate salt formed in the solution is the least soluble of the perrhenate salts and thus makes separation more effective and simple to obtain. The concomitantly produced tungstate salt is very soluble, so that it becomes a relatively simple procedure to get separation under this rather unique set of conditions.

In order to illustrate a system employing potassium hydroxide, the following example is given.

Example II

Scrap tungsten-rhenium alloy (97%–3%) in rod form was supported in a polyethylene container, and electrical connection made between the scrap and a positive source of direct current. The cathode consisted of a cylinder of platinum gauze surrounding the scrap, the cathode being connected to the negative side of the current source. The electrolyte employed was a solution of potassium hydroxide at a concentration of 25% by weight. A current of 5 amps. could be maintained across the cell at a potential of approximately 2.2 volts, under which conditions the resulting electrolyte temperature was about 40° C.

The use of potassium hydroxide as the electrolyte greatly speeds up the dissolution in comparison with the results obtainable using ammonium hydroxide, and a commercial process based on the use of such electrolyte has now been developed and put into operation. The salient features of the process are described below.

Example III

Scrap rhenium-containing material is placed in a platinum-coated tantalum basket which is supported in a cell of glass, plastic or similar non-reactive material. The basket is made the anode and the electrolyte is a solution of potassium hydroxide at a concentration of about 12.5%. Electrolysis is commenced at 3 volts, with a current of 100 amperes, and is continued until the solution becomes greenish and milky. The voltage rises in the course of this operation to about 4 volts, and the caustic is partially consumed and requires replenishing so as to maintain the solution distinctly alkaline. In the process, the electrolyte operates just below its boiling point, around 100° C., and is effectively agitated by hydrogen gas evolved at the anode. The resulting product is a solution of potassium perrhenate and, depending on the composition of the scrap, may also contain potassium orthotungstate and/or potassium molybdate.

The rhenium values are recovered from solution by conventional techniques substantially as described in Example I. Generally, the solution is heated to about 90°–100° C., filtered and then cooled to ambient temperature. This precipitates about 85% of the total potassium perrhenate. The mother liquor containing additional rhenium values is again heated to evaporate about 75% of the liquid, filtered and cooled with agitation during which further precipitation occurs so that, in the aggregate, by two such crystallization steps, better than 95% of the rhenium values are removed.

The remaining mother liquor still contains residual amounts of metal values and may be reincorporated in the solution being introduced to the first crystallization step.

In the foregoing procedure, the anodic dissolution approaches 100% efficiency.

The process is operative with ammonium hydroxide as previously demonstrated. However, potassium hydroxide is found to be about 300 to 500 times more conductive at concentrations of about 10% to 40% by weight (which is the range of maximum conductivity) than ammonium hydroxide at its maximum conductivity concentration range (about 4–8% by weight). Potassium hydroxide is accordingly the much preferred electrolyte for this reason alone. It is also preferred because it facilitates later recovery of the rhenium values free from contamination of other components.

The concentration of the electrolyte is selected on the basis of economic factors. However, the concentration must be sufficiently high throughout the electrolysis such that the solution is clearly alkaline. Optimum concentrations have been indicated above and in general afford maximum solution conductivity.

During electrolysis, hydroxides of aluminum, silicon, iron, thorium, tungsten, magnesium and tantalum may be formed in the electrolyte. These hydroxides are very low in solubility and are dropped out of the potassium perrhenate product during the recrystallization steps.

The effectiveness of the process is not dependent on the rhenium content of the alloy, nor the alloying constituent or constituents. The process has been practiced with an alloy of molybdenum and rhenium containing only one-quarter of 1% of rhenium. It has also been found operative for scrap that contains 3%, 25% and 50% rhenium, the balance being molybdenum, and for scrap that consists wholly of rhenium. The same is true of tungsten alloys, and the process has been employed successfully with the principal commercial tungsten-rhenium alloys containing 3%, 10% and 25% rhenium, and similar alloys containing thoria.

The process exhibits no problem of threshold voltage, but the normal working voltage range is preferably between 3 to 4, with a current of 100 amperes. There is, however, an upper limit on the voltage and current density because of a competing reaction at the higher levels. Thus, at high voltages, oxygen is evolved and there is a tendency for the formation of an oxide film on the scrap and resulting polarization. Under such conditions, the efficiency of the process drops off although it remains operative.

As a further refinement of the process when practiced commercially, it may be made continuous by using a porous diaphragm between the anode and cathode, and by continuously withdrawing the electrolyte solution, cooling and filtering this to crystallize and separate the precipitated rhenium values. The filtrate, replenished with the alkali hydroxide as required to maintain the desired electrolyte concentration as well as necessary volume, is then returned to the cell. Addition of scrap to the anode basket is likewise made as required. Hydrogen evolved at the anode can also be recovered, dried and purified for use in a later stage of processing in reducing ammonium perrhenate.

What is claimed is:

1. The process of recovering rhenium metal values from rhenium-containing scrap metal by electrolytic dissolution of such scrap, which consists in making such scrap metal the soluble anode in an electrolytic cell wherein the electrolyte is an equeous solution of an alkali hydroxide selected from the group consisting of potassium and ammonium, passing a current through such electrolyte and scrap material and maintaining the alkalinity of the solution until said rhenium-containing material is dissolved and recovering the rhenium-values in said electrolyte in the form of the perrhenate salt of the hydroxide employed as the electrolyte.

2. The process of recovering rhenium metal values from rhenium-containing scrap material by electrolytic dissolution of such scrap, which consists in placing such scrap material in a basket constituting an insoluble anode of an electrolytic cell wherein the electrolyte is an aqueous solution of potassium hydroxide, passing a current through said electrolyte and anode basket and maintaining the alkalinity of said solution until said rhenium containing material is dissolved, and recovering the rhenium values in said electrolyte in the form of potassium perrhenate.

3. The process as defined in claim 2, wherein the concentration of said potassium hydroxide is approximately 12.5% by weight.

4. The process as defined in claim 2, wherein the electrolyzing current is initially impressed at about 3 volts and 100 amperes.

5. The process of recovering rhenium metal values from rhenium-containing scrap metal by electrolytic dissolution, which consists in placing the scrap metal in a basket constituting an insoluble anode of an electrolytic cell wherein the electrolyte is an aqueous solution of ammonium hydroxide and ammonium perrhenate, passing a direct current through said electrolyte and anode basket and maintaining the alkalinity of said electrolyte solution until said scrap is dissolved, and recovering the rhenium values in said electrolyte in the form of ammonium perrhenate.

6. The process as defined in claim 5, wherein the initial concentration of said ammonium hydroxide is approximately 14.8 molar and of said ammonium perrhenate is approximately 0.375 molar.

7. The process as defined in claim 5, wherein the electrolyzing current is maintained at approximately 50 amperes and said electrolyte at a temperature of approximately 80° C.

References Cited

UNITED STATES PATENTS

| | | | |
|---|---|---|---|
| 748,609 | 1/1904 | Hunt | 204—96 |
| 1,687,056 | 10/1928 | Carl | 204—96 |

JOHN H. MACK, *Primary Examiner.*

H. M. FLOURNOY, *Assistant Examiner.*